(12) United States Patent
Steijer et al.

(10) Patent No.: US 8,867,869 B2
(45) Date of Patent: Oct. 21, 2014

(54) MINIATURIZED HIGH SPEED OPTICAL MODULE

(75) Inventors: Odd Steijer, Bromma (SE); Magnus Andersson, Jaerfaella (SE); Lars-Goete Svenson, Sollentuna (SE)

(73) Assignee: Tyco Electronics Svenska Holdings AB, Jaerfaella (SA)

( * ) Notice: Subject to any disclaimer, the term of this patent is extended or adjusted under 35 U.S.C. 154(b) by 0 days.

(21) Appl. No.: 13/230,429

(22) Filed: Sep. 12, 2011

(65) Prior Publication Data
US 2012/0063718 A1 Mar. 15, 2012

(30) Foreign Application Priority Data
Sep. 13, 2010 (EP) .................................. 10009507

(51) Int. Cl.
G02B 6/12 (2006.01)
G02B 6/42 (2006.01)

(52) U.S. Cl.
CPC ............ *G02B 6/4214* (2013.01); *G02B 6/4292* (2013.01); *G02B 6/4201* (2013.01)
USPC ........ 385/14; 385/88; 257/E31.127; 257/680; 438/125

(58) Field of Classification Search
CPC .. G02B 6/4201; G02B 6/4204; G02B 6/4246; H01L 31/0232; H01L 31/173; H05K 2201/10121
USPC ......... 385/14, 88, 93; 257/E31.127, E21.705, 257/E25.013, E25.023, E31.117, 680; 438/125
See application file for complete search history.

(56) References Cited

U.S. PATENT DOCUMENTS

| | | | | |
|---|---|---|---|---|
| 5,249,245 A | * | 9/1993 | Lebby et al. | 385/89 |
| 6,477,286 B1 | * | 11/2002 | Ouchi | 385/14 |
| 6,531,341 B1 | * | 3/2003 | Peterson et al. | 438/123 |
| 6,792,171 B2 | * | 9/2004 | Hargis et al. | 385/14 |
| 6,910,812 B2 | * | 6/2005 | Pommer et al. | 385/92 |
| 7,104,703 B2 | * | 9/2006 | Nagasaka et al. | 385/88 |
| 7,539,366 B1 | * | 5/2009 | Baks et al. | 385/14 |

(Continued)

FOREIGN PATENT DOCUMENTS

| | | | |
|---|---|---|---|
| EP | 1447695 A2 | 8/2004 | |
| EP | 1602955 A2 | 12/2005 | |
| WO | WO 9613069 A1 * | 5/1996 | ............ H01L 31/02 |
| WO | WO 03044916 A1 * | 5/2003 | ............... H01S 5/22 |

OTHER PUBLICATIONS

Search Report issued by the European Patent Office, dated Feb. 8, 2011, for Priority Application No. EP 10009507.4, 8 pages.

*Primary Examiner* — Peter Radkowski
(74) *Attorney, Agent, or Firm* — Faegre Baker Daniels LLP

(57) ABSTRACT

The present disclosure relates to an optical module comprising a carrier substrate including first electrical connection terminals on a first surface and second electrical connection terminals on a second surface electrically connected to the first electrical connection terminals. The second electrical connection terminals are connectable to a circuit carrier. The optical module further comprises an optically transparent carrier including first electrical connection terminals, and an optical element electrically connected to the optically transparent carrier. The optically transparent carrier is mechanically attached and electrically connected to the carrier substrate trough corresponding first electrical connection terminals, and the optical element is connected on a first surface of the optically transparent carrier and is adapted to emit/receive light through the optically transparent carrier to/from an optical coupling element facing a second surface of the optically transparent carrier opposing the first surface.

14 Claims, 9 Drawing Sheets

(56) References Cited

U.S. PATENT DOCUMENTS

| | | |
|---|---|---|
| 2002/0196997 A1* | 12/2002 | Chakravorty et al. .......... 385/14 |
| 2004/0136638 A1* | 7/2004 | Baechtle et al. ................ 385/14 |
| 2004/0240797 A1 | 12/2004 | Nagashima |
| 2004/0240798 A1* | 12/2004 | Baur .............................. 385/88 |
| 2004/0247232 A1* | 12/2004 | Kathman et al. ................ 385/14 |
| 2005/0041935 A1* | 2/2005 | Liu ................................ 385/92 |
| 2005/0169569 A1* | 8/2005 | Liu ................................ 385/14 |
| 2005/0238294 A1* | 10/2005 | Nagasaka et al. ............... 385/88 |
| 2009/0226130 A1* | 9/2009 | Doany et al. .................... 385/14 |
| 2010/0061683 A1* | 3/2010 | Sasaki ............................. 385/88 |

\* cited by examiner

MINIATURIZED HIGH SPEED OPTICAL MODULE

BACKGROUND

The present invention relates to optical modules and in particular, to an optical module for use in high bit rate applications comprising an optically transparent carrier mechanically attached and electrically connected to a carrier substrate connectable to a circuit carrier.

Optical interconnects became in recent years widely used in electronic devices due to their capability of supporting a much higher bandwidth than traditional cable interconnections. In this context, the development of optical modules for converting optical signals into electrical signals and vice-versa plays a crucial role in a wide range of applications, such as midboard applications, using optical interconnects.

Common optical modules are realized by an optically transparent carrier assembly including various optical elements. An example of a known optical module is illustrated in FIG. 15. The optical module 2100 includes a carrier 2110 optically transparent to a defined wavelength, on top of which optical elements such as optical receivers and transmitters 2120 as well as various integrated circuits 2130 are mounted. The optical transmitters and receivers 2120 and the integrated circuits 2130 are connected to connection terminals 2103 arranged on a surface of the transparent carrier 2110 by means of connecting traces 2112. In applications currently on the market, the optically transparent carrier assembly 2100 is connected to a circuit carrier, such as a printed circuit board or a connector socket, for instance by soldering the transparent carrier 2110 to the circuit carrier.

In present applications the optical module 2100 can be designed to be mounted on a circuit carrier. In such a configuration, the active optical elements will emit light through the optically transparent carrier 2110 towards a direction opposing the circuit carrier. The light will be focused and redirected by means of an optical coupling element, which is normally arranged on top of the optically transparent carrier so as to align a lens with the optical elements 2120. In this kind of applications, there is an opening in the circuit carrier through which the heat is dissipated by means of a thermal bridge (not shown) in order to transfer the heat generated by integrated circuits and optical elements.

An arrangement in which the optical module is directly connected to a circuit carrier 2200 by soldering electrical connection terminals on the optically transparent carrier 2110 and electrical connection terminals on the circuit carrier 2200 is shown in FIG. 16. Further, the optical module 2100 and the printed circuit board 2200 can be assembled into a module casing 2500. This arrangement is illustrated in FIG. 17. The casing 2500 acts as a primary heat sink by the arrangement of the thermal bridge.

Although the module described in FIGS. 15 to 17 is quite compact, according to this design the transparent carrier mounting the optical elements 2120 is directly mounted on the circuit carrier 2200 and therefore can be only used in applications where the circuit carrier 2200 is designed so that the casing 2500 can act as heat sink. Moreover, according to the existing design, the transparent carrier 2110 is generally fixed on the circuit carrier 2200 by means of solder bumps or adhesive attach, since any other fixing design such as a by means clamping element or the like may damage the transparent carrier 2110 mounting the optical elements 2120. Therefore, the optical module 2100 can only be used in application whose mechanical connection requirements can be satisfied by a solder bump or adhesive connection.

However, different applications using optical modules may have very different requirements concerning the generated heat, the thermal dissipation, mechanical and/or electrical connection, direction of light and the like. Moreover, some applications may need an optical module where the optical interface is fixed, while other applications may require an optical module with a detachable optical interface. Finally, it may be advantageous to have an optical module adapted to be mounted on a circuit carrier, such as a printed circuit board, according to different fixing designs, such that the same optical module can be used in different applications using different mounting schemes.

The underlying problem addressed by the present invention is therefore to provide a miniaturized optical module capable of being mounted on a circuit carrier, which is robust and assures reliable mechanical, electrical and optical connections with the circuit carrier and which can operate in a variety of applications having different requirements regarding optical, electrical, thermal and mechanical connections.

SUMMARY

This object is solved by the subject matter of the independent claims. Advantageous embodiments of the present invention are subject matter of the dependent claims.

The present invention is based on the idea of providing an optical module adapted to be mounted on a circuit carrier, which can be used for a variety of applications, which complies with their specific requirements concerning the optical, electrical, thermal and mechanical connection, which has compact dimensions and which can be produced at low cost.

The optical module of the invention comprises a carrier substrate including first electrical connection terminals on a first surface and second electrical connection terminals on a second surface electrically connected to the first electrical connection terminals. The second electrical connection terminals are connectable to a circuit carrier. The optical module further comprises an optically transparent carrier including first electrical connection terminals, and an optical element electrically connected to the optically transparent carrier. The optically transparent carrier is mechanically attached and electrically connected to the carrier substrate trough corresponding first electrical connection terminals, and the optical element is connected on a first surface of the optically transparent carrier and is adapted to emit/receive light through the optically transparent carrier to/from an optical coupling element facing a second surface of the optically transparent carrier opposing the first surface.

According to this configuration, the optically transparent carrier mounting the optical element is connected to a circuit carrier not directly but through the substrate carrier. Therefore the optical module can be connected to the circuit carrier so as to meet the specific requirements, i.e. regarding mechanical connections, of a particular application. For example, the optically transparent carrier may be soldered to the circuit carrier so as to meet certain mechanical requirements avoiding stressing the optical elements and the electrical connections on the optically transparent carrier during reflow soldering. Alternatively, the carrier substrate may be designed to be detachably mounted to the circuit carrier by means, for instance, of a clamping arrangement. Moreover, the carrier substrate is more compact than a common board to board connector plug, thereby contributing reducing the overall dimensions of the optical module.

Furthermore, the carrier substrate may include a first opening on at least a first surface thereof. The optically transparent carrier may be then arranged inside the first opening.

Accordingly, the optically transparent carrier mounting the optical elements is protected at least by the lateral faces of the carrier substrate, thereby increasing the robustness of the entire optical module.

According to a further development, the optical module may further include the optical coupling element. The optical coupling element may include a lens assembly and may be arranged in the first opening of the carrier substrate so as to face the second surface of the optically transparent carrier opposing the first surface so that the lens assembly is aligned to the optical element. The optical coupling element may be attached to the second surface of the optically transparent carrier.

Accordingly the optical module may be directly used without requiring any further modification at the consumer side.

Moreover, the optically transparent carrier may be arranged so that the first surface on which the optical element is mounted faces outwards the carrier substrate.

According to a further embodiment, the optical coupling element is adapted to receive a light guiding means and fix said light guiding means relative to the lens assembly by means of a fastener, which may de a clamping lid or a guiding funnel.

Furthermore, the carrier substrate include a second opening, the optical coupling element being adapted to receive the light transmitting means through said second opening. The second opening may be advantageously formed on a surface of the carrier substrate perpendicular to the plane of the first opening.

According to a further development, the optical module comprises a heat dissipating element arranged above the first surface of the optically transparent carrier and arranged so as to dissipate the heat of the optical element.

Further, the heat dissipating element may be attached to the optical module by means of a thermal sealant.

Accordingly, the thermal sealant may contribute to increase the heat dissipation performance of the optical module and at the same time contributes protecting the optical element by isolating same from the outside.

The optical module may further comprise at least one surface mount device electrically connected to the optically transparent carrier or the substrate carrier.

This surface mount device may be mounted on the optical module depending on the particular application the module is intended for. The possibility of including additional devices increases the flexibility of the optical module.

The optical module may further include an interposer adapted to be mounted on the circuit carrier and to electrically connect the carrier substrate to the circuit carrier. Moreover, the interposer may be designed so as to be detachably connected to the circuit carrier. The electrical connection between the interposer and the carrier substrate may be established through the second electrical connection terminals.

The carrier substrate may be fixable to the socket by means of a clamping force arrangement or by an adhesive layer.

Accordingly, the substrate carrier does not need to be directly fixed on the circuit carrier, i.e. by reflow soldering, thereby reducing the probability of damaging the optical elements and other delicate components of the optical module. In addition, by means of the interposer the optical module can be easily attached to the circuit carrier at the costumer side, without the need of performing complicated process steps, such as reflow soldering and the like.

According to an advantageous embodiment, the carrier substrate may be made of a material thermically compatible to the optically transparent carrier.

If the carrier substrate is made of a material thermically compatible to the material of the optically transparent carrier, during operation and/or during soldering, the transparent carrier and the carrier substrate will react similarly to temperature changes, thereby avoiding stressing the electrical contacts joining the parts of the optical module. Accordingly, the reliability and the performance of the optical module can be increased.

Advantageously, the carrier substrate of the optical module may be made of a multi-layer ceramic or organic material.

Carrier substrates made of multi-layer ceramic or organic materials have similar thermal characteristics as the most commonly used optically transparent layers and are further capable of better withstanding soldering temperature used for soldering the optical module onto a circuit carrier. Moreover, such carrier substrates are rigid enough to withstand clamping forces necessary to connect the optical module to the interposer in designs where the optical module is connected to the circuit carrier by means of a detachable interposer.

Further, the optically transparent carrier may be made of pyrex glass substantially transparent to a wavelength of 850 nm.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages would become apparent from the following and more particular description of the invention as illustrated in the accompanying drawings, wherein.

DETAILED DESCRIPTION

In the following description, for explanatory purposes, specific details are set forth in order to provide a thorough understanding thereof. It may be evident, however, that the present invention can be practiced without these specific details. Furthermore, well know structures and devices are only described in a more general form in order to facilitate the description thereof.

Figure 1:
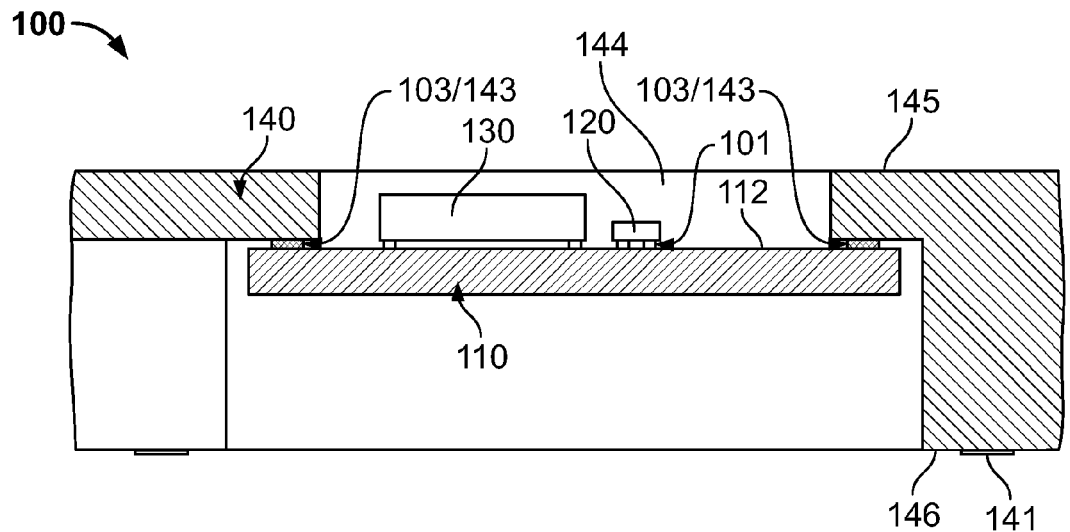
FIG. 1 shows a sectional view of an optical module according to a first embodiment of the present invention.

FIG. 1 shows in a sectional view an optical module 100 according to the present invention. The optical module 100 may be an optical transceiver and may be connected to a circuit carrier, such as a printed circuit board (PCB), a connecting socket or the like, and then used in fiber optical interconnections for mid-board applications or as an intra-board or inter-board module. The optical module 100 includes an optically transparent carrier 110, on which may be fixed one or more integrated circuits 130 or any kind of surface mount component. The optically transparent carrier 110 further includes one or more optical elements 120. The optical elements 120 may be transmitters and receivers, such as vertical-cavity surface-emitting laser (VCSEL) or PIN diodes, or more generally any kind of light of emitting or receiving element. The integrated circuits 130 may for instance include a driver and/or TIA.

The optical transparent carrier 110 may be made of pyrex glass optically transparent for a defined wavelength, the standard communication wavelength used in mid-board applications being 850 nm. However, the transparent carrier may be chosen so as to be transparent to other wavelengths according to the specific application of the optical module. Moreover, alternative to the pyrex glass, other types of optically transparent materials having other optical characteristics may also be used.

The transparent carrier 110 further includes metal wirings and first electrical connection pads 103 on a first surface 112 of the transparent carrier 110. The first surface 112 will be also indicated in the following as top surface of the transparent carrier 110. The optical elements 120 and the integrated circuits 130 may be mounted on said first surface 112 and are electrically connected to the transparent carrier 110. The optical elements 120 and the integrated circuits 130 may be attached to the transparent carrier 110 by any kind of known means capable of conducting current, for instance by means of solder bumps 101. The metal traces included in the transparent carrier 110 connect the optical elements 120 and the integrated circuits 130 through the solder bump to the first electrical connection pads or terminals 103. The electrical connection terminals 103 may be arranged at the periphery of the transparent carrier 110. The transparent carrier 110 is mechanically attached and electrically connected to a carrier substrate 140. In order to assure an electrical connection, first electrical connection terminals 143 on the carrier substrate 140 mate corresponding electrical connection pads 103 on the transparent carrier 110. The carrier substrate 140 and the transparent carrier 110 may be mechanically attached by fixing the mating electrical connection terminals 103 and 143 to each other. The mating electrical connection terminals 103 and 143 may be for instance connected by reflow soldering or adhesive attachment.

Although in the particular embodiment described above the optical elements 120 and the integrated circuits 130 are mounted on the first surface 112 of the transparent carrier 110 including the connection terminals 103, the optical elements 120 and the integrated circuits 130 may also be mounted on any other surface of the transparent carrier 110. Similarly, also the connection terminals 103 may be mounted on any other side of the optically transparent carrier 110 according to the particular application for which the optical module 100 is designed.

The carrier substrate 140 may be box-shaped and may have a first opening 144 from a bottom surface 146 connectable to a circuit carrier to an upper surface 145 opposing the bottom surface 146. The upper surface 145 protrudes inwardly into the first opening 144 in the plane of the upper surface so as to form a bulge or a protrusion 147. Accordingly, the area of the first opening 144 at the top surface 145 is smaller than the area of the first opening 144 at the bottom surface 146. The surface of the protrusion 147 facing the bottom surface 146 of the carrier substrate 140 includes electrical connection terminals, which may be arranged on the periphery of the protrusion 147. The transparent carrier 110 is attached to the protrusion 147 by means of the electrical connection pads 103 so as to be entirely or partially within the opening of the carrier substrate 140. Moreover, the transparent carrier 110 may be arranged such that the surface 112, on which the optical elements 120 and the integrated circuits 130 are mounted, faces the opening of the top surface 145 of the carrier substrate 140.

In this manner, the top surface 112 of the transparent carrier 110, on which the optical elements 120 and the integrated circuits 130 are mounted, faces or is totally or partially within the first opening 144 at the top surface 145 of the carrier substrate 140. Since the top surface 145 opposes the surface 146 of the carrier substrate mountable on a circuit carrier, at least a part of the optical elements 120 and the integrated circuits 130 is not surrounded by any device or substrate. In other words the optical elements 120 and the integrated circuits 130 are only partially surrounded by a substrate or a circuitry portion and can therefore better dissipate the heat generated during operation of the optical module 100.

Although the particular embodiment described above refer to a box shaped substrate carrier, it has to be understood that the carrier substrate 140 may be designed so as to have any other shape according to the specific application and the particular needs at the costumer side.

During operation of the optical module 100, the optical elements 120, fed by electrical signals through the carrier substrate and the optically transparent carrier, emit light through the optically transparent carrier 110 towards the bottom surface 146 of the carrier substrate 140. The emitted light may then be received by an optical coupling element and coupled into light guiding elements such as wave guides or the like.

Similarly, the optical elements 120 may receive light through the optically transparent carrier 110 and convert the optical beam into electric pulses, which will then be transmitted to the carrier substrate through the electrical connection terminals 103 and 143. The electric signal may then be transmitted from the carrier substrate 140 to a circuit carrier by means of bottom electric connection terminals 141 of the carrier substrate.

The carrier substrate 140 is capable to handle high frequency signalling so that the optical module 100 can be used for high bit rate fibre applications. Moreover, the transparent carrier 110 and the carrier substrate 140 are connected according to a flip-chip design. Accordingly the optical elements 120 and the integrated circuits 130 are connected to the circuitry of the transparent carrier 110 with solder bumps that have been deposited onto the chip pads. Therefore, the optical module 100 does not have bond wires connecting the optical elements 120 and the integrated circuits 130 to corresponding connection pads, thereby providing a more compact design. Moreover, the flip-chip design allows producing a more robust optical module 100, since such a module does not include external bond wires which may deteriorate and brake if exposed to mechanical or thermo-mechanical stress. Although the characteristics of the carrier substrate 140 are described in relation to the embodiment of FIG. 1, the carrier substrate 140 described above may be also used in the embodiments described in the following.

Figure 2:
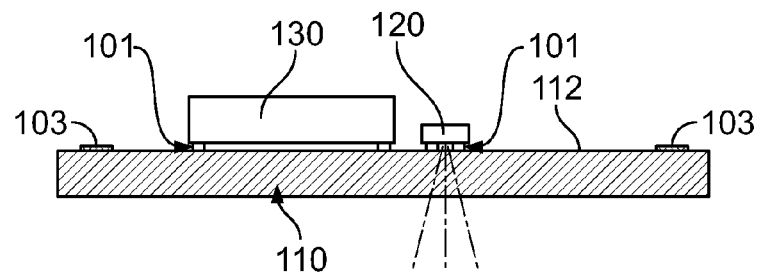
FIG. 2 shows a sectional view of an optically transparent carrier used in the present invention.

FIG. 2 illustrates an optical element 120 in operation and shows how the emitted light passes through the transparent carrier 110.

Figure 3:
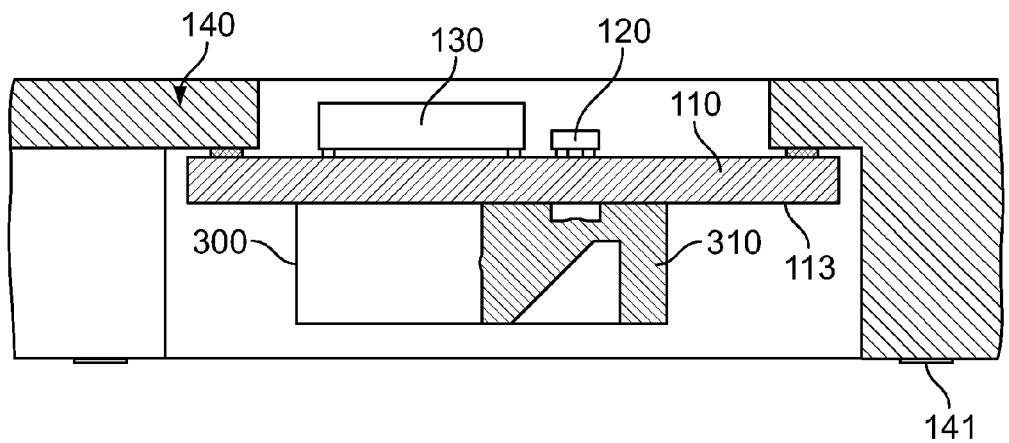
FIG. 3 shows a sectional view of an optical module according to a further embodiment of the present invention.

FIG. 3 shows an embodiment of the present invention wherein the optical module 110 further includes an optical coupling element 300. The optical coupling element 300 is adapted to direct light to/from the optical element 120. The optical coupling element 300 may be attached to a second surface 113 of the transparent carrier 110. The second surface 113 is a bottom surface opposing the first surface 112 on which the optical elements 120 and the integrated circuits 130 are mounted. The optical coupling element 300 includes a lens assembly 310 aligned to the optical elements 120 and adapted to focus light received from a light guiding means (not shown) directly onto the optical elements 120. Clearly, the lens assembly 310 may also be capable of performing the reverse operation and focus light emitted by the optical elements 120.

In order to allow mounting light guiding means to the optical coupling element 300, one side surface of the carrier substrate 140 perpendicular to the top and bottom surfaces 145 and 146 may have a second opening 148.

Figure 4:
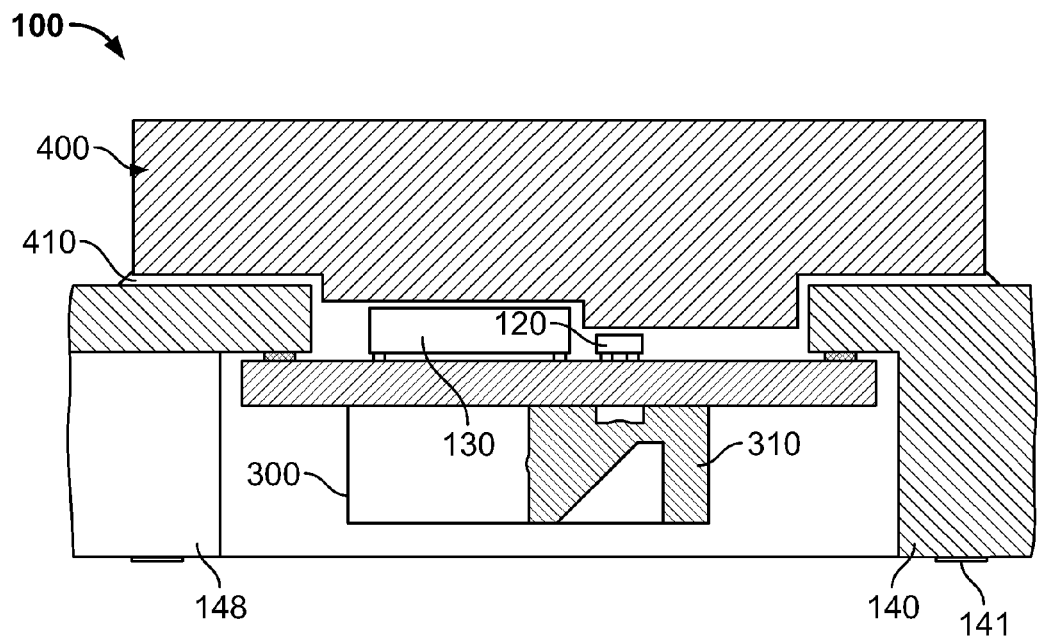
FIG. 4 shows a sectional view of an optical module according to a further embodiment of the present invention.

In FIG. 4, the optical module 100 includes a heat dissipating element 400 arranged on the top surface 145 of the carrier substrate 140 and thermally connected to the back of the optical elements 120 and the integrated circuits 130. The heat dissipating element 400 has the function of a heat sink and is arranged so as to dissipate the heat of the optical elements 120 and the integrated circuits 130. For instance, the heat dissipating element 400 may be made of a material with high thermal conductivity, for instance aluminium, and may include ribs or protrusions so as to increase the dissipating area and improve the cooling performances, e g by forced air cooling (see also FIGS. 7 and 9). The heat dissipating element 300 is attached to the carrier substrate 140 by means of a thermal compound or sealant 410. The thermal sealant 410 may also have the further function of protecting the optical elements 120 and the integrated circuits 130 by sealing them from the external environment. Moreover, the thermal sealant may be thermally connected to the optical elements 120 and the integrated circuits 130. Therefore, if the thermal sealant 410 is made of a compound with high thermal conductivity, this will increase the heat dissipating performances of the optical module 100 during operation.

Figure 5:
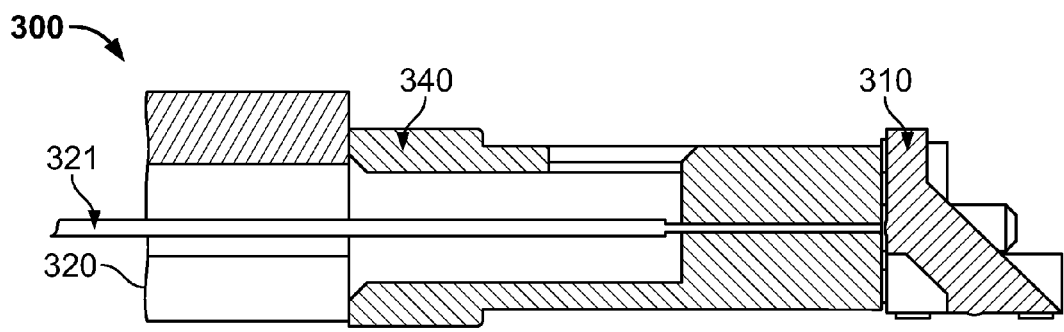
FIG. 5 shows a sectional view of an optical coupling element used in the present invention.

FIG. 5 shows a detail of the optical coupling element 300 which may be used in combination with an optical module 100 according to the present invention. The optical coupling element 300 includes a light guiding means 320 and a lens assembly 310. The light guiding means 320 may include for example a standard type fiber-ribbon MT-ferrule 340 and light guiding elements 321 such as waveguides or the like. The lens assembly 310 may be for example a standard type right angle array lens with MT interface. The lens assembly 310 may be fixed to the transparent carrier by adhesive, while the MT-ferrule may be either glued or clamped to the lens assembly 310. In an advantageous embodiment the ferrule may be fixed to the lens assembly 310 or alternatively detachably mounted to the latter. Although the optical coupling element 300 is described as including an MT-ferrule and a lens array with MT interface, the invention is not limited to the type of ferrule and connector described above and the optical module 100 can be designed for use with any kind of light guiding element 320 and lens assembly 310. During operation, the lens assembly 310 may direct light from the waveguides 321 directly to the optical elements 120 or alternatively may receive from the optical elements 120, light to be focused into the waveguides 321. Alternatively, the light may be reflected in the lens assembly 310 by a further means such as a beam splitter or a prism adapted to split the received light into several beams to be reflected onto separate optical elements 120.

Figure 6:
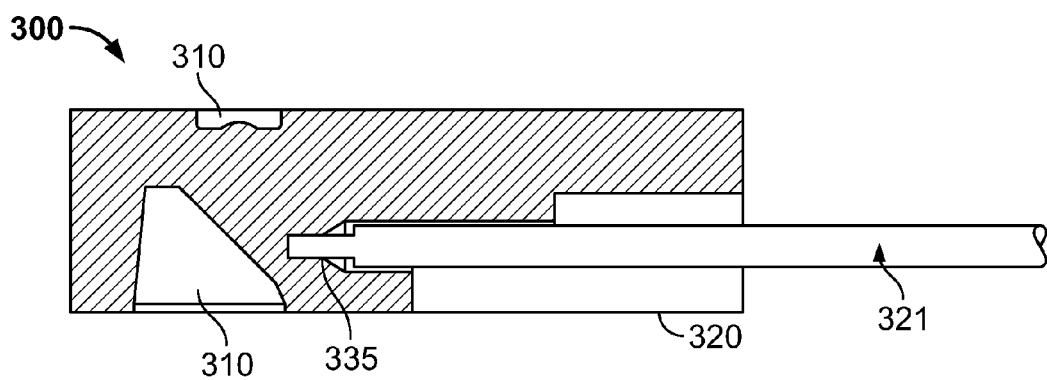
FIG. 6 shows a sectional view of an alternative optical coupling element for use in the optical module of the present invention.

FIG. 6 shows an alternative realization of an optical coupling element 300. In this embodiment, the optical coupling element 300 includes a tapered portion 335 in which the waveguide 221 of the optical coupling element can be inserted and fixed, thereby excluding the need for an MT-ferrule. The tapered portion 335 may have the form of a guiding funnel for the waveguide 321. As for the previous embodiment, also in this case, the lens assembly 310 is further adapted to receive and/or transmit light from the optical elements 120 into the waveguide 321. In particular, the lens assembly 310 may direct light from the waveguides 321 directly to the optical elements 120 or alternatively may receive from the optical elements 120, light to be focused into the waveguides 321. In addition, the light received by the lens assembly 310 may then be further redirected onto the optical elements 320 by means of light redirecting means such as mirrors or prisms and the like. Further, the light from the waveguide 321 may be split by a beam splitter and further emitted onto different optical elements 120.

In the optical coupling element 300 illustrated in FIGS. 5 and 6, the lens assembly 310 is designed to tilt the light 90 degrees by totally reflecting the light in an air/polymer interface.

The lens assembly 310 and the optical elements 120 may be actively or passively aligned. More precisely, in the first case, the coupled power (i.e. laser to waveguides 321) is monitored during alignment. The position of the waveguide 321 is changed and power is continuously monitored. The waveguides 321 is fixed in the position that gives a predefined coupling level needed for the particular application in which the optical module 100 will be used. The waveguide 321 may be fixed, for example, by Ultra Violet (UV) cured adhesive. In the case of passive alignment, the coupled power is not monitored during the alignment process, which is conducted by mechanical guiding or fiducial marks which allow high precision pick and place positioning of the waveguide 321.

Figure 7:
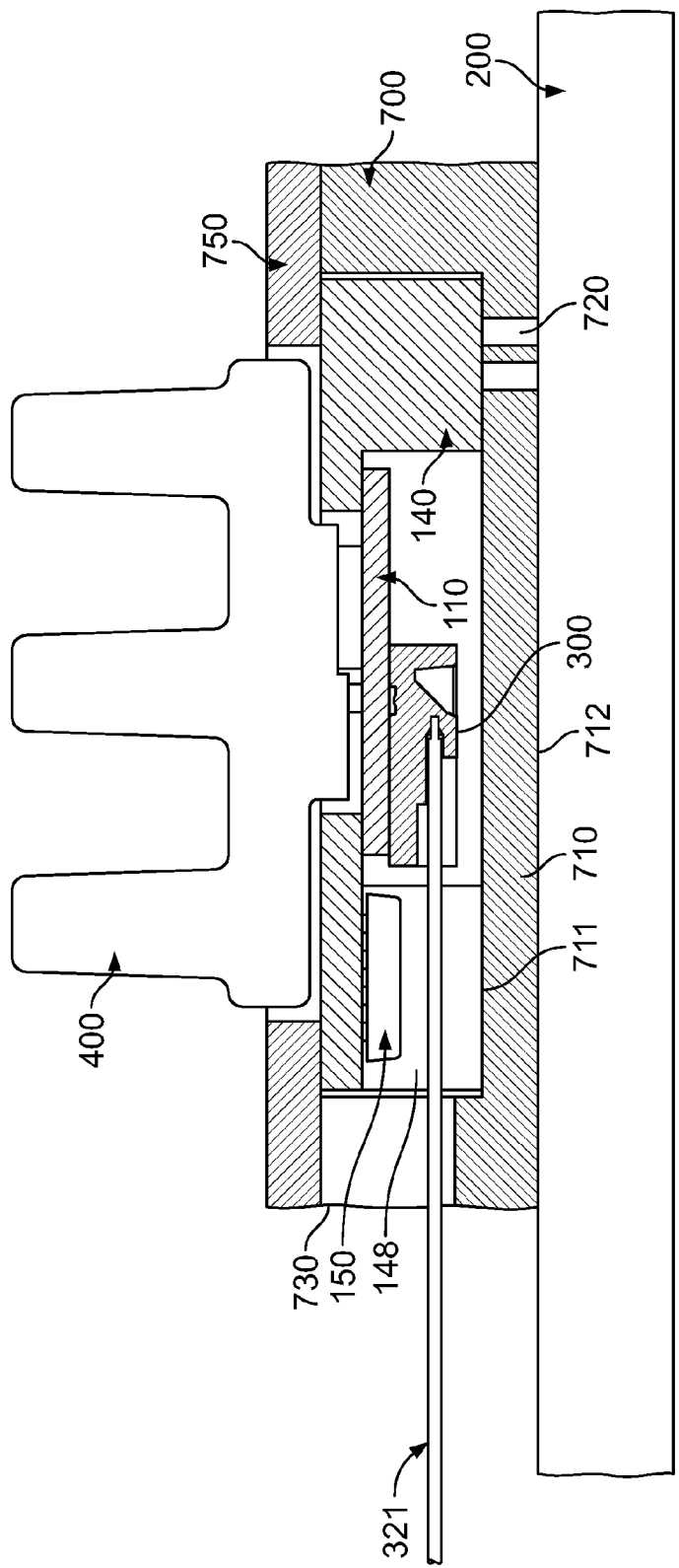
FIG. 7 is a sectional view of an optical module connected to a printed circuit board according to a further embodiment of the present invention.
Figure 8:
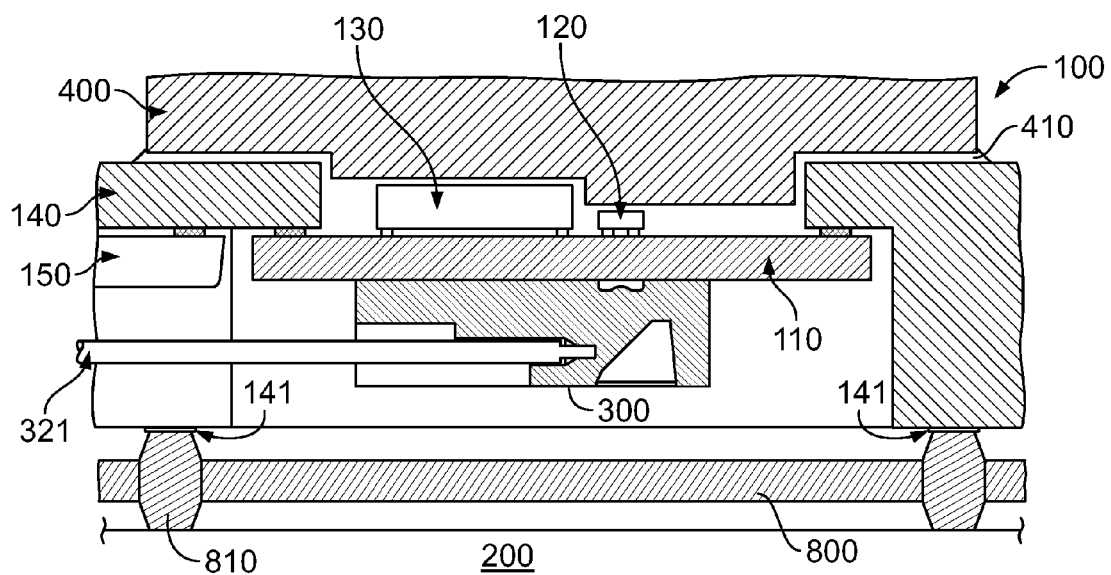
FIG. 8 shows a sectional view of an optical module connected to a printed circuit board according to another embodiment of the present invention.

FIGS. 7 and 8 illustrate two alternative embodiments wherein the optical module 100 further includes an interposing element or interposer 700, 800 having the function of a connecting socket for connecting the optical module 100 to a circuit carrier 200 such as a printed circuit board or the like. The interposer 700, 800 may be a detachable electric connector such as a Land Grid Array (LDA) socket, an interfacing block or the like. The optical module of FIGS. 7 and 8 include parts already described with reference to FIGS. 1 to 6, which are indicated with like reference signs and need not be described again.

FIG. 7 illustrates an optical module 100 wherein the interposing element 700 includes a first surface or bottom surface 710 adapted to be connected to the circuit carrier 200, and a lateral surface perpendicular to the first surface 710. The first surface 710 of the interposing element 700 includes electrical contacting terminals on its inner and outer faces 711, 712 connected by means of through-connections 720 such as vertical interconnect accesses (VIAs). The carrier substrate 140 is arranged onto the inner face 711 of the bottom surface 710 of the interposing element 700 so that the second electrical contacting terminals 141 of the carrier substrate mate the electrical contacting terminals of the interposing element 700. The interposing element 700 may include, on a lateral surface perpendicular to the bottom surface 710, a lateral opening 730 through which waveguides 321 can reach the optical coupling element 300. The lateral opening 730 of the interposing element 700 may at least partially coincide with the second opening 148 of the substrate 140 such that the optical coupling element 300 can receive the light guiding element 320 through the second opening 148 and the lateral opening 730. The interposing element 700 may further include a clamping element 750, such as a clamping lid, which may be arranged on top of a lateral surface of the interposing element 700 and fixed thereon so as to, at least partially, cover the upper surface 145 of the carrier substrate 140. In this manner, the optical module 100 can be firmly fixed between the bottom surface 710 of the interposing element 700 and the clamping lead 750.

As further illustrated in FIG. 7, the optical module 100 may include at least one further surface mount device 150, such as an integrated circuit, a micro-controller chip, a decoupling capacitor and the like. The surface mount device 150 may be arranged within the second opening 148 and mounted inwardly on the upper surface 145 of the carrier substrate 140 so as to face the bottom surface of the carrier substrate 140. The interposer 700 may have the function of a socket for connecting the circuitry of the optical module 100 to the circuit carrier 200. The connection between the optical elements 120 and the surface mount devices 150 and 130 is established through the electrical contacting terminals of the interposing element 700 and the first and second electrical contacting terminals 103, 143 and 141 of the carrier substrate and the optically transparent carrier 110.

FIG. 8 shows an alternative embodiment, wherein the interposing element 800 has essentially the shape of a board to be interposed between the carrier substrate 140 and the circuit carrier 200. In this embodiment, the electrical contacting terminals of the interposing element 800 for mating corresponding electric terminals 141 of the carrier substrate 140 may be formed on one or more foot 810 disposed along the perimeter of the carrier substrate 140 in correspondence to the second electrical contacting terminals 141.

The interposer 700, 800 may be soldered or fixed by adhesive attachment on the circuit carrier 200, or it may be detachably mountable on the circuit carrier 200 by means of a clamping arrangement or the like.

According to the embodiments of FIGS. 7 and 8, the substrate carrier 140 does not need to be directly fixed on the circuit carrier 200, i.e. by directly soldering the contact terminals 141 on the circuit carrier 200, thereby reducing the probability of damaging the optical elements and other delicate components of the optical module during the reflow soldering process. In these configurations, high frequency electrical signals are routed from the carrier substrate 140 to the interposer 700, 800 and from the interposer to the circuit carrier 200. Advantageously, the carrier substrate 140 can be made of a rigid material capable of withstanding a clamping force used to connect the optical module 100 to the interposer 700, 800. Moreover, the carrier substrate may be chosen so as to be thermo-mechanically compatible to the optically transparent carrier 110. As an example, the carrier substrate 140 and the optically transparent carrier 110 may be chosen so as to have similar thermo-mechanical characteristics, such as thermal coefficient of expansion. Carrier substrates having the above mentioned properties may be made of a multi-layer ceramic or organic material and the like.

Figure 9:
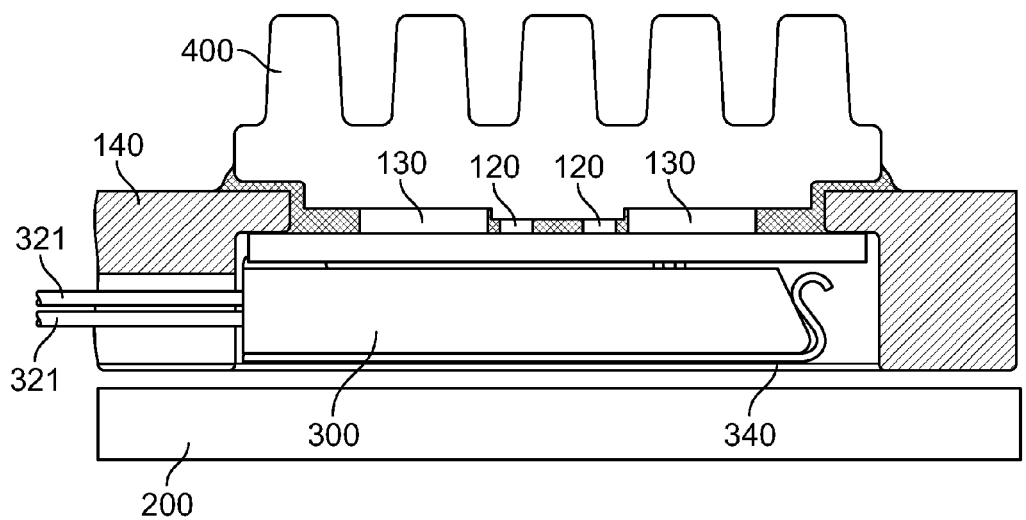
FIG. 9 is a sectional view of an optical module connected to a printed circuit board according to a further embodiment of the present invention.

Although FIGS. 7 and 8 show embodiments, wherein the optical module 100 is connected to the circuit carrier 200 by means of an interposer or socket 700, 800, in a further embodiment, the optical module 100 may be designed so as to be directly connectable on the circuit carrier 200. In this case, electrical contacting terminals 141 of the circuit carrier will be directly connected to connecting pads on the circuit carrier 200. This embodiment is shown in FIG. 9. Moreover, FIG. 9 shows a clamping lid used as fastener 340 for the light guiding means 320, for example to connect a MT-type ferrule to an array lens.

Figure 10:
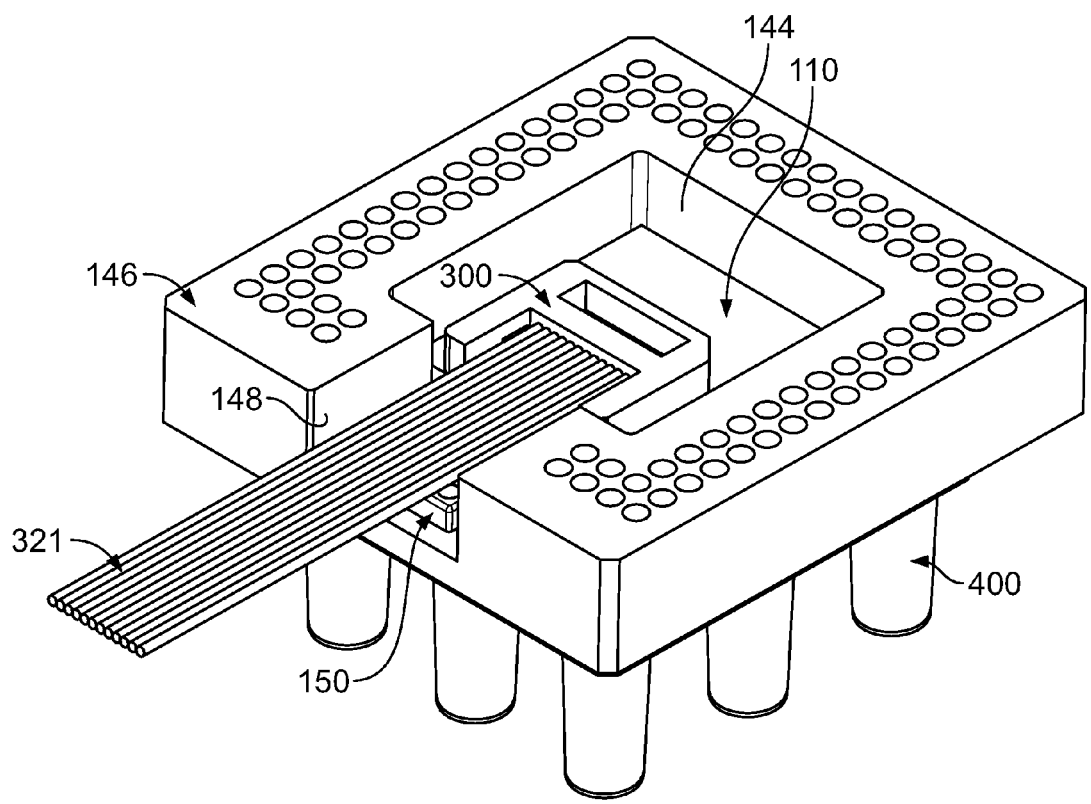
FIG. 10 is a perspective view of an optical module according to an embodiment of the present invention.

FIG. 10 shows a perspective view of a fully assembled optical module 100 including a heat dissipating element 400, the carrier substrate 140, the optically transparent carrier 110, the additional surface mount device 150 and the optical coupling element 300. From this view, it is possible to see the outer face of the bottom surface 146 of the carrier substrate 140. Moreover, it is possible to see the first opening 144 going through the carrier substrate 140 from the bottom surface 146 to the top surface 145, and the second opening 148 on the lateral surface of the carrier substrate 140 forming a passage for the waveguides 321 into the optical coupling element 300. Moreover, from this figure, it is also possible to see the arrangement of the surface mount device 150 on the inner face of the top surface of the carrier substrate 140 formed by the second opening 148.

Figure 11:
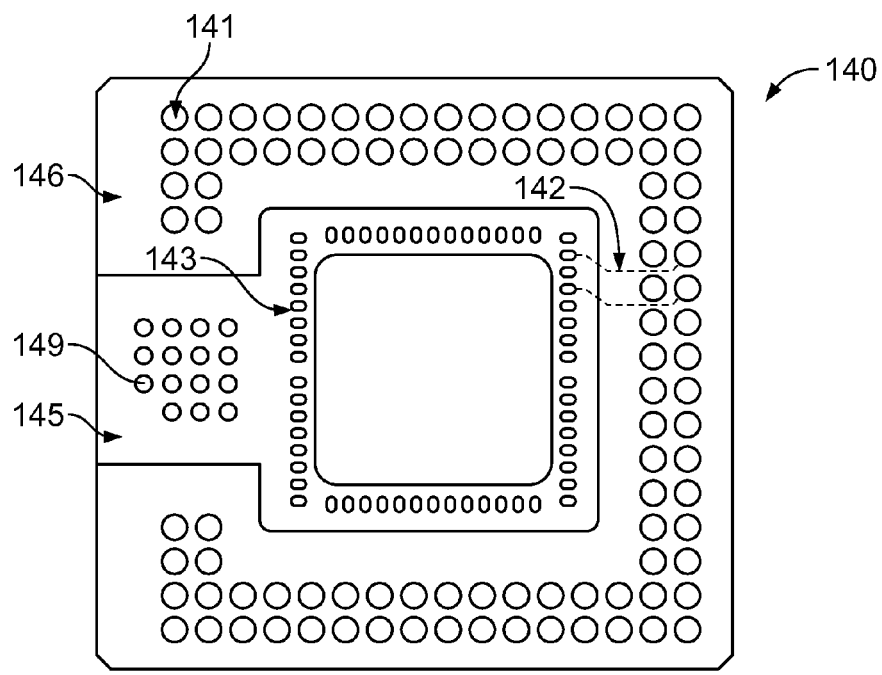
FIG. 11 shows a plane view of a substrate carrier for use in the optical module according to an embodiment the present invention.

FIG. 11 shows a plane view of the carrier substrate 140. In particular, FIG. 11 illustrates an outer face of the bottom surface 146 of the carrier substrate 140. The second electrical contacting terminals 141 on the bottom surface 146 are connected by means of connecting traces 142 to the first electrical connecting terminals 143 arranged on the inner face of the top surface 145 of the carrier substrate 140. From this figure, it can be clearly seen how the top surface 145 protrudes inwardly with respect to the bottom surface 146 so that the area of the first opening 144 is smaller at the top surface 145 than at the bottom surface. The optically transparent carrier 110 may be attached to the portion of the inner face of the top surface 145 which protrudes inwardly in the first opening 144 so that the electrical conducting terminals 103 of the optically transparent carrier 110 contacts corresponding first electrical contacting terminals 143 of the carrier substrate 140. Further connecting terminals 149 are formed on the inner face of the upper surface 145 in correspondence to the second opening 148. Said further contacts 149 may be used for connecting additional surface mount components.

Although FIGS. 1 to 11 show embodiments wherein the optical module is arranged so that the back of the optical elements 120 and the integrated circuit 130 face outwardly in a direction opposing the circuit carrier 200, the optical module 100 may also be configured so as to be connected in a flipped manner. This configuration is shown in FIGS. 12 to 14.

Figure 12:
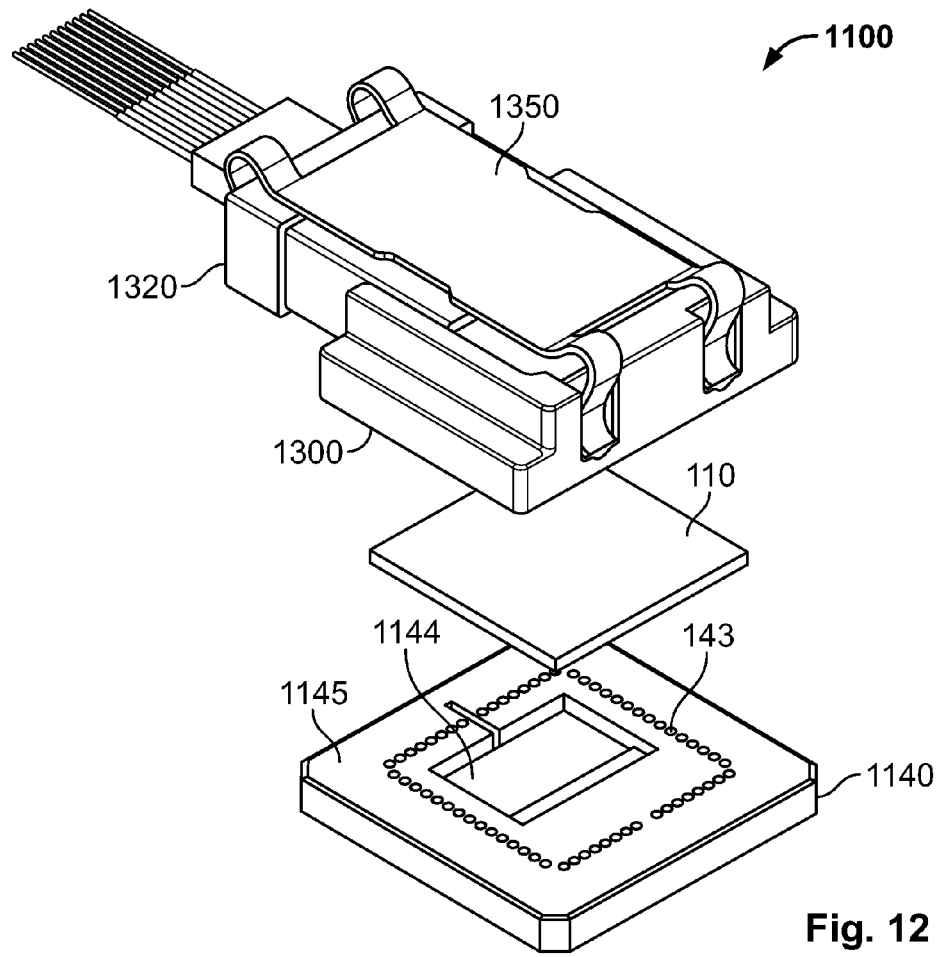
FIG. 12 shows an exploded perspective view of an optical module according to a further embodiment the present invention.

In particular, FIG. 12 shows an exploded perspective view of an optical module 100 according to a further embodiment. Accordingly, the carrier substrate includes a recess 1144 adapted to receive the back of the optical elements 120 and the integrated circuits 130, wherein with the term back is intended the side of the elements 120, 130 opposing the side facing the transparent carrier 110. The optically transparent carrier 110 is fixed on the carrier substrate 1140 so that electrical connection terminals 103 on the optically transparent carrier 110 connects to corresponding connection terminals 143 on the carrier substrate 1140 and such that the optical elements 120 and the integrated circuits 130 are fitted into the recess 1144. In this configuration, electrical connection terminals 143 of the carrier substrate 1140 are formed on the outer face of the top surface 1145. The bottom surface of the carrier substrate 1140 is adapted to be connected to a circuit carrier 200. The optical coupling element 1300 may be fixed on the top surface 1145 so that the lens assembly 1310 is aligned with the optical elements 120. The light guiding means 1320 may be connected to the optical coupling element 1300 and fixed thereto by a clamping lid 1350.

In this embodiment, the optical coupling element 1300 is placed on top of the carrier substrate 1140 and lies outside same. Therefore, the carrier substrate 1140 may also be designed so as to have only one recess.

Figure 13:
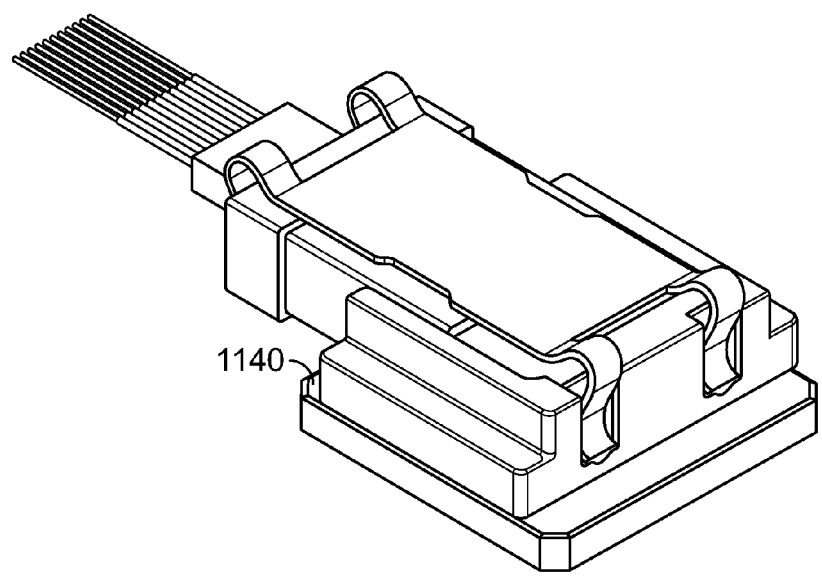
FIGS. 13 and 14 show two different perspective views of the optical module of FIG. 12.
Figure 14:
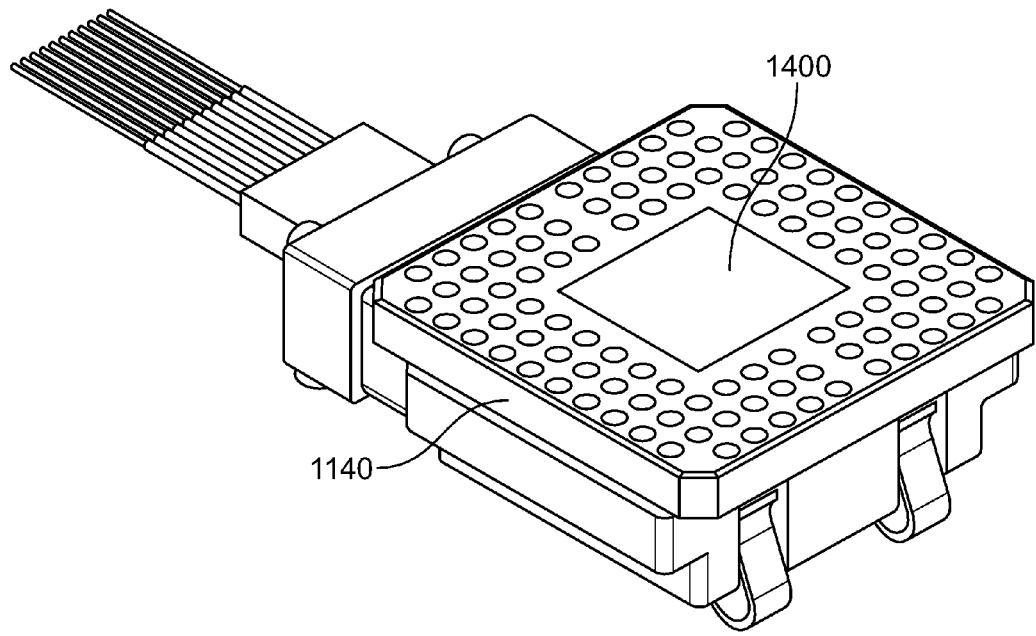
Figure 15:
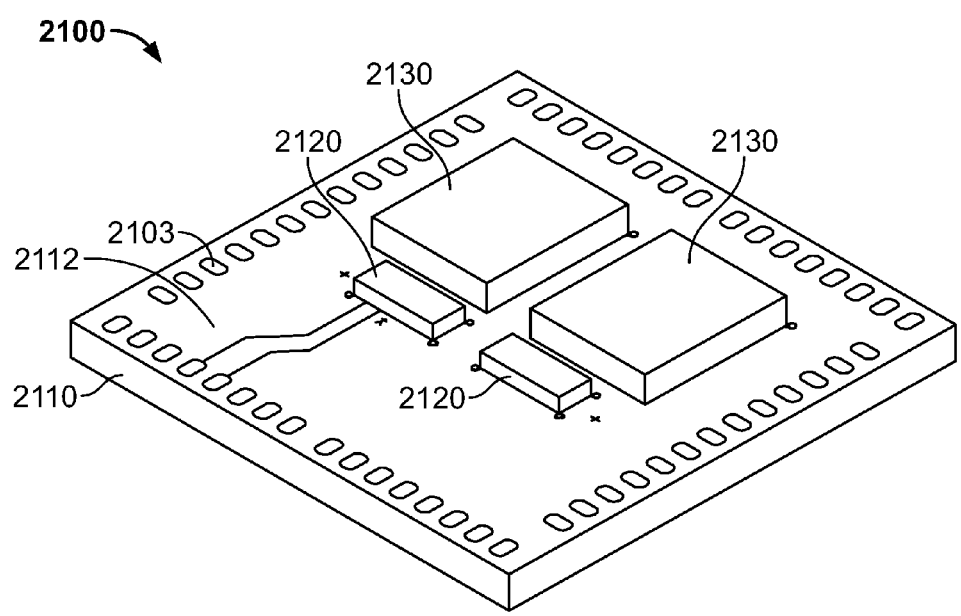
FIG. 15 shows an optical module according to the prior art.
Figure 16:
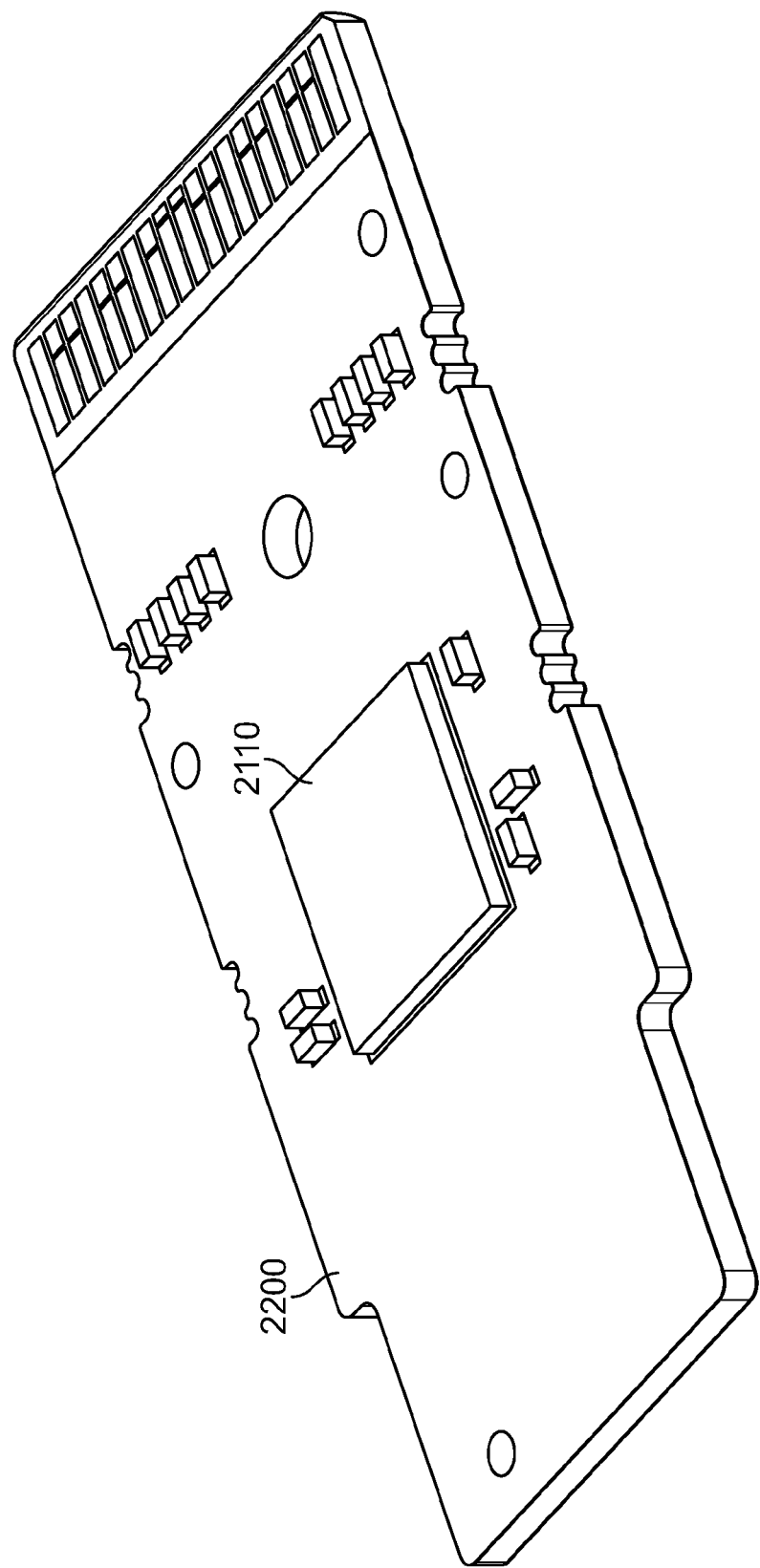
FIG. 16 shows a perspective view of a printed circuit board including the optical module according to the prior art.
Figure 17:
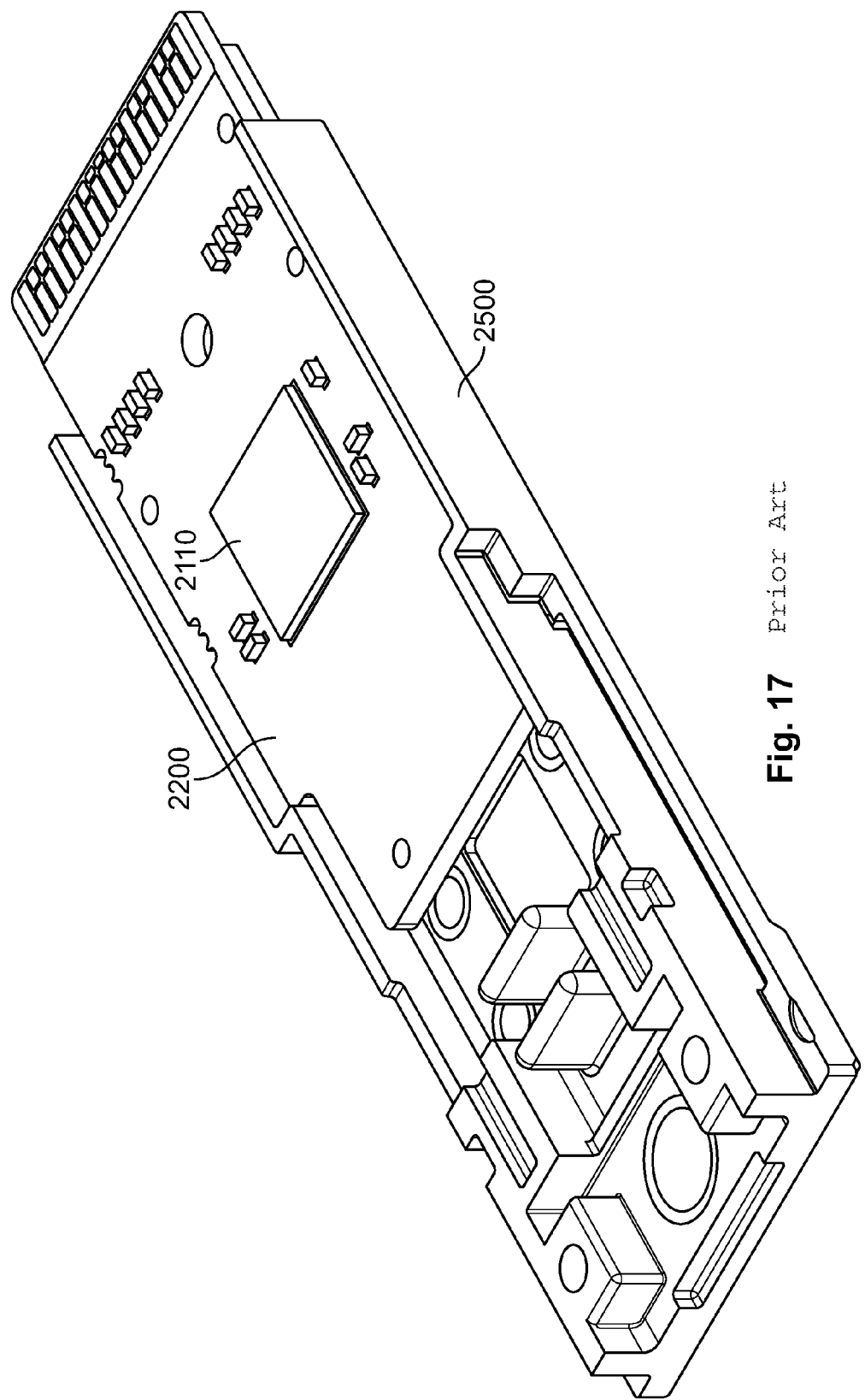
FIG. 17 shows a perspective view of a module casing including the printed circuit board of FIG. 16.

FIGS. 13 and 14 are perspective views showing the optical module of FIG. 12 from the top and the bottom. In particular, from FIG. 14, it is possible to see the heat dissipating element 1400. According to these embodiments, the heat dissipating element 1400 is formed on the bottom surface of the carrier substrate 1140 in correspondence to the recess 1144 adapted to receive the optical elements 120 and the integrated circuits 130. When mounted on the circuit carrier 200, the carrier substrate 1140 may be fixed such that the heat dissipating element 1400, which may be a thermal pad, corresponds to a thermal pad on the circuit carrier 200 functioning as heat sink.

In all the embodiments described above, the carrier substrate may be of a ceramic material. Although also other plastic or silicon materials may be used instead of ceramic, using a ceramic carrier has the advantage that the carrier is capable of better withstanding soldering temperature used for soldering the optical module 100 onto the circuit carrier 200. Moreover, ceramic has similar thermal characteristics as the most commonly used optically transparent layers 110. Therefore, during operation and/or during soldering, the transparent carrier 110 and the carrier substrate 140 will react similarly to temperature changes, thereby avoiding stressing the electrical contacts joining the parts of the optical module.

In conclusion, according to the present invention, an optical module is provided wherein an optically transparent carrier mounting an optical element 120 is mechanically and electrically connected to a carrier substrate 140. Accordingly, the optical module can easily be connected to a circuit carrier 200, such as a printed circuit board without the need of using an intermediate circuit carrier including a board-to-board connector as socket. Since the ceramic carrier can be designed to have smaller dimensions with respect to commonly used board-to-board connectors, the overall dimensions of the optical module 100 can be drastically reduced. Moreover, the optical module 100 of the invention is capable of being adapted to a variety of operating conditions. In other words, the present invention proposes an optical module 100 capable of complying with thermal, mechanical, electrical and optical requirements of a wide range of applications, in particular, for equipment used for ultra high speed optical modules for intra- and inter-board communication devices.

The invention claimed is:

1. An optical module to be mounted on a circuit carrier, the optical module comprising:
    a carrier substrate including first electrical connection terminals on a first surface thereof, second electrical connection terminals on a second surface electrically connected to the first electrical connection terminals, the second electrical connection terminals being connectable to the circuit carrier;
    an optically transparent carrier including first electrical connection terminals, wherein the carrier substrate includes a first opening on at least a first surface thereof and the optically transparent carrier is positioned completely within the first opening; and
    an optical element electrically connected to the optically transparent carrier,
    wherein the optically transparent carrier is mechanically attached and electrically connected to the carrier substrate within the first opening through corresponding first electrical connection terminals;
    wherein said optical element is connected on a first surface of the optically transparent carrier and is adapted to emit/receive light through the optically transparent carrier to/from an optical coupling element facing a second surface of the optically transparent carrier opposing said first surface; and
    wherein the carrier substrate has thermal characteristics similar to the thermal characteristics of the optically transparent carrier.

2. The optical module of claim 1, further including the optical coupling element, said optical coupling element comprising a lens assembly and being arranged in the first opening and facing a second surface of the optically transparent carrier so that the lens assembly is aligned to the optical element.

3. The optical module of claim 2, wherein the optical coupling element is attached to the second surface of the optically transparent carrier.

4. The optical module of claim 1, wherein the optically transparent carrier is arranged so that the first surface faces outwards the carrier substrate.

5. The optical module of claim 2, wherein the optical coupling element is adapted to receive a light guiding means, said light guiding means being aligned to the lens assembly and mounted by means of a fastener.

6. The optical module of claim 2, wherein the carrier substrate include a second opening, the optical coupling element being adapted to receive the light guiding means through said second opening.

7. The optical module of claim 1, further comprising a heat dissipating element arranged above the first surface of the optically transparent carrier and arranged so as to dissipate the heat of the optical element.

8. The optical module of claim 7, wherein the heat dissipating element is attached to the optical module by means of a thermal sealant.

9. The optical module of claim 1, further comprising at least one surface mount device electrically connected to the optically transparent carrier or the substrate carrier.

10. The optical module of claim 1, further including an interposer adapted to be mounted on the circuit carrier and to electrically connect the carrier substrate to the circuit carrier.

11. The optical module of claim 10, wherein the carrier substrate is fixable to the interposer by means of a fastening element.

12. The optical module of claim 1, wherein the substrate carrier is made of a multi-layer ceramic or organic material.

13. The optical module of claim 1, wherein the optically transparent carrier is made of pyrex glass substantially transparent to a wavelength of 850 nm.

14. The optical module of claim 1, wherein the optically transparent carrier is mechanically attached and electrically connected to the carrier substrate between a bottom surface of the carrier substrate and a top surface of the carrier substrate.

* * * * *